July 5, 1949.  E. E. TURNER, JR  2,475,363
SYSTEM FOR ECHO RANGING
Filed April 10, 1945  10 Sheets-Sheet 3
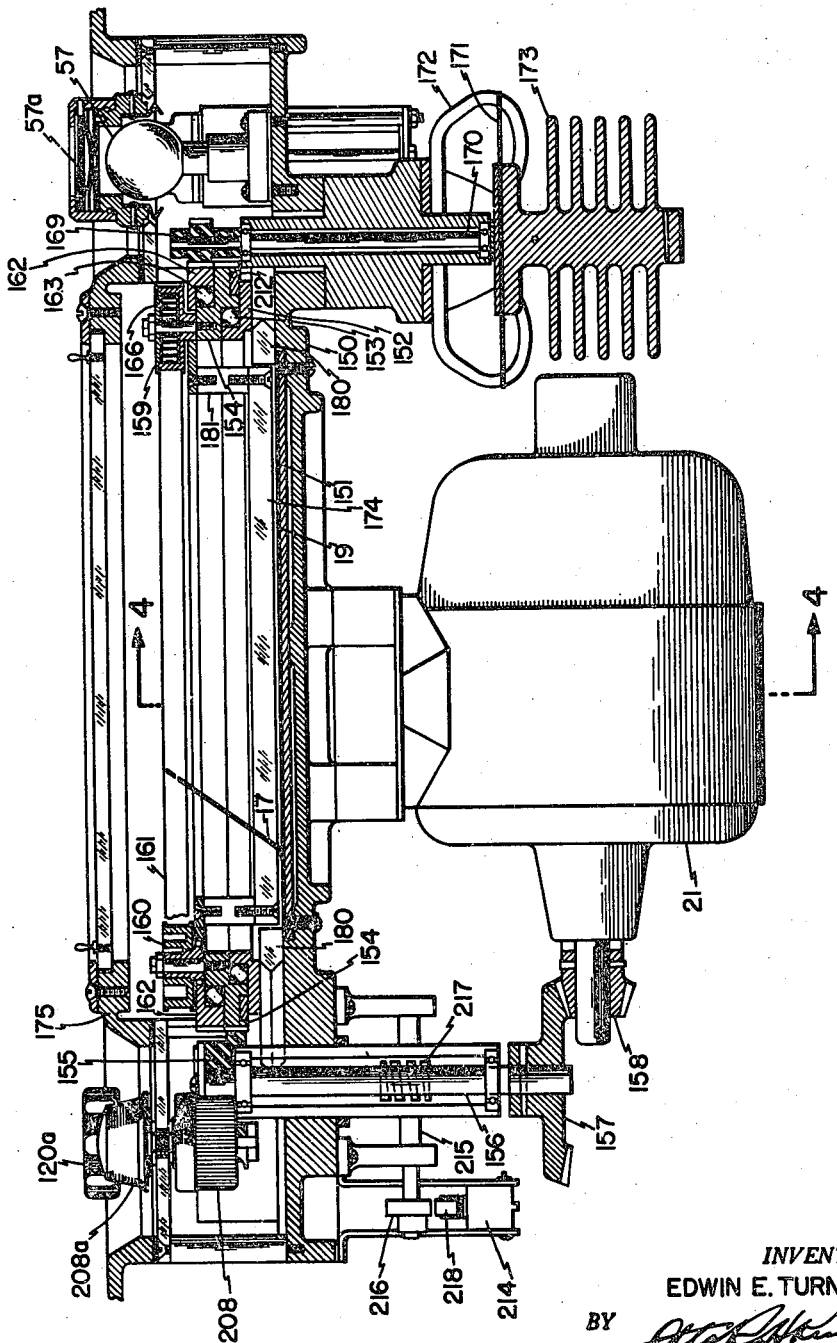
FIG. 3
INVENTOR.
EDWIN E. TURNER JR.
BY 
HIS ATTORNEY July 5, 1949.                E. E. TURNER, JR                2,475,363
                        SYSTEM FOR ECHO RANGING
Filed April 10, 1945                                   10 Sheets-Sheet 4

INVENTOR.
EDWIN E. TURNER JR.
BY
HIS ATTORNEY

INVENTOR.
EDWIN E. TURNER JR.
BY
HIS ATTORNEY

July 5, 1949.    E. E. TURNER, JR    2,475,363
SYSTEM FOR ECHO RANGING

Filed April 10, 1945    10 Sheets-Sheet 6

INVENTOR.
EDWIN E. TURNER JR.
BY
HIS ATTORNEY

INVENTOR.
EDWIN E. TURNER JR.
BY
HIS ATTORNEY

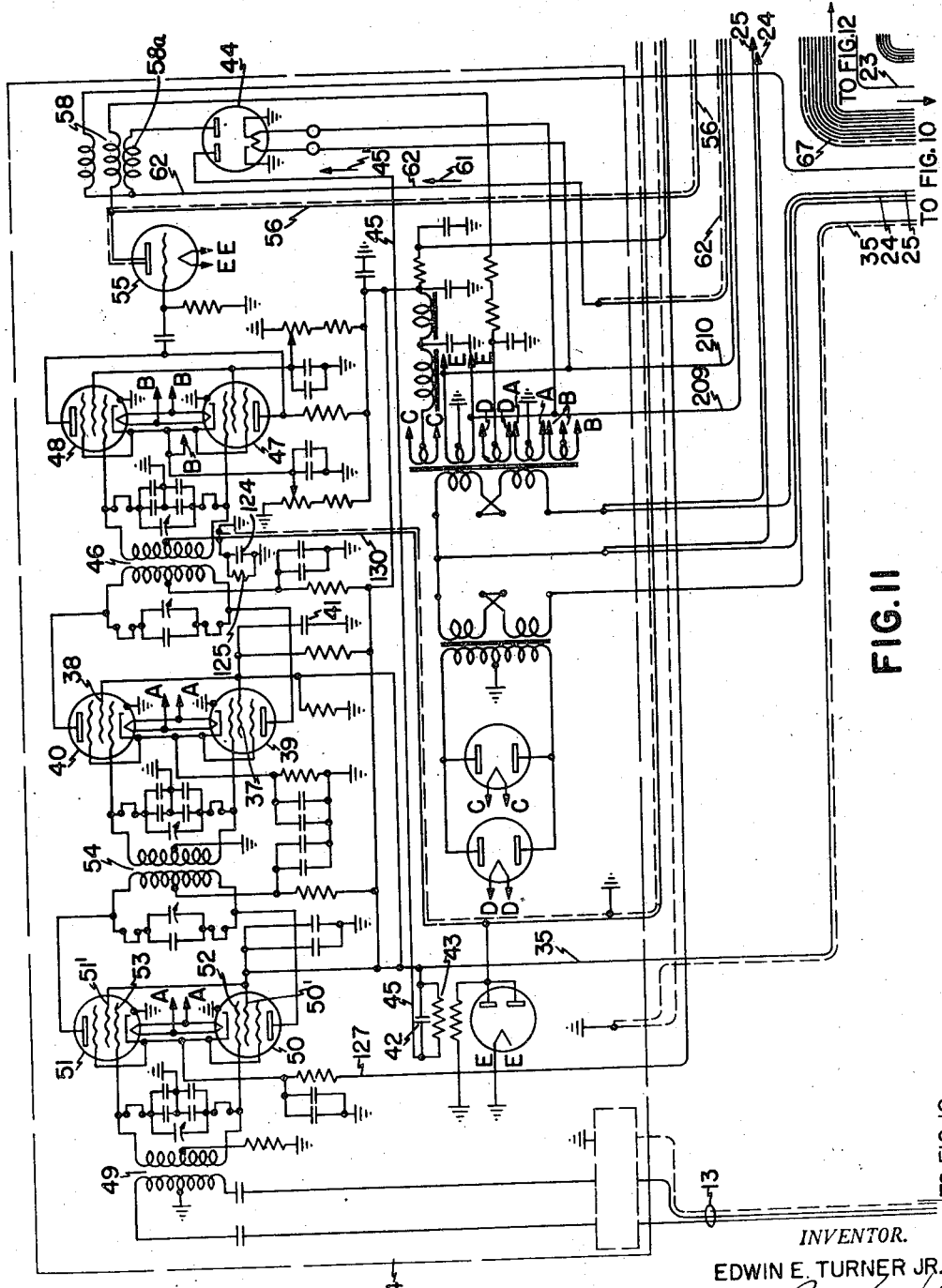
FIG. 11
INVENTOR.
EDWIN E. TURNER JR.
BY 
HIS ATTORNEY

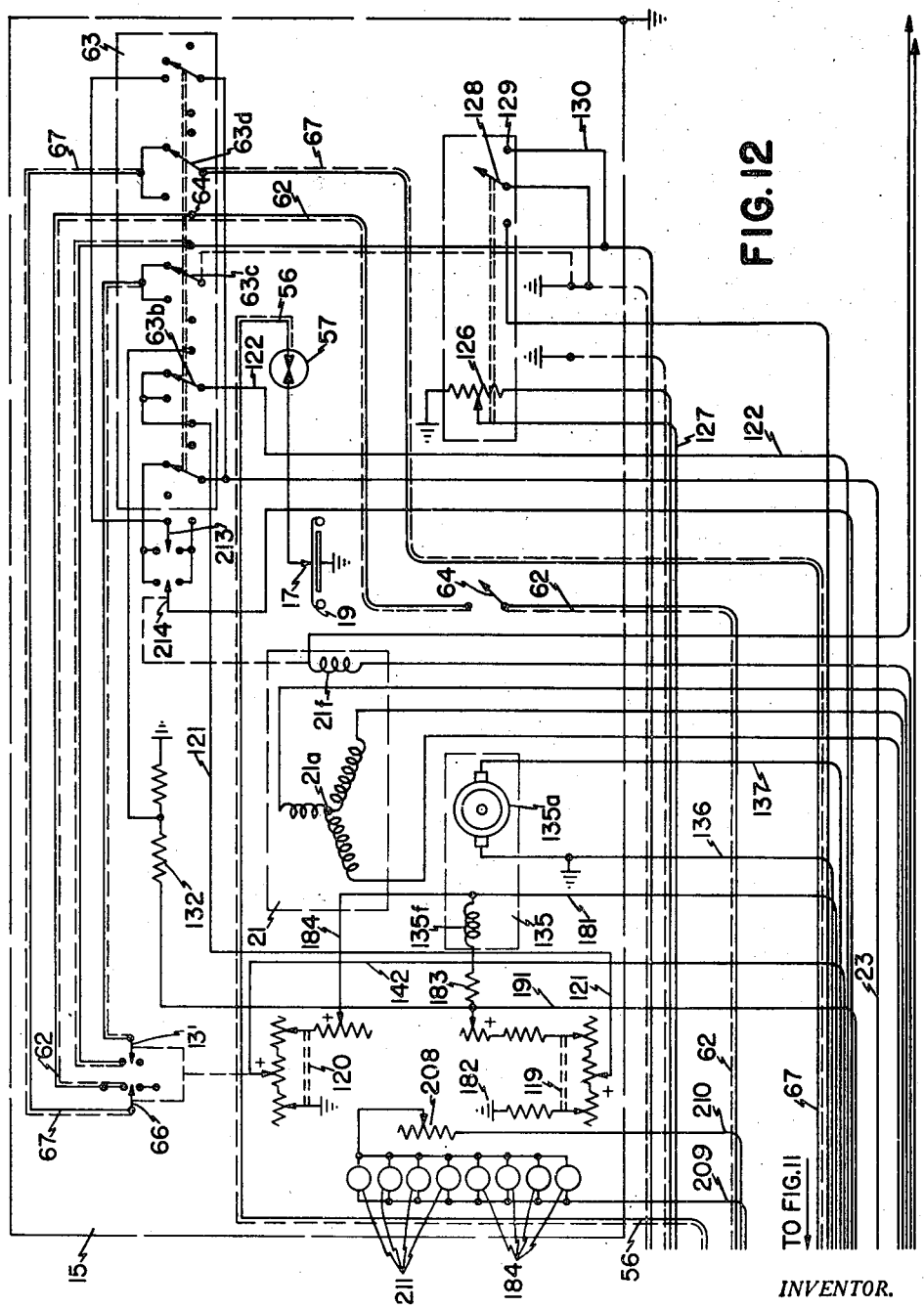

Patented July 5, 1949

2,475,363

UNITED STATES PATENT OFFICE 2,475,363

SYSTEM FOR ECHO RANGING

Edwin E. Turner, Jr., West Roxbury, Mass., assignor, by mesne assignments, to Raytheon Manufacturing Company, a corporation of Delaware Application April 10, 1945, Serial No. 587,633

14 Claims. (Cl. 177—386)

The present invention relates to a signaling system for the detection of unknown objects and in particular to a method of detection of objects in a water medium by the use of compressional waves.

The present invention also has special applications for military uses in providing a means of detecting enemy submarines or surface vessels. In this respect the system, when installed on a vessel, provides means of automatic and continuous search in all sectors about the vessel to provide for the detection and determination of direction of objects by observation of sounds produced by the object and the detection and determination of both direction and distance of an object by echo ranging, within the operational range of the system.

The apparatus employed in the present invention has many new and useful features which on the whole tend to provide for almost all contingencies which may occur. As a vessel is normally proceeding on its chosen course, the system will range fore and aft of the vessel at a chosen distance, which is to say that any object or obstacle appearing at that distance will be detected and its direction determined. As a detected object and the vessel approach one another, the apparatus will continue to range on the object giving both its distance and direction as the distances decrease and the courses change. In the event that the object is no longer picked up, then the ranging zone, in order again to detect the object, will automatically increase again until a maximum range setting has been arrived at, whereupon unless the apparatus is set to continue to range for the maximum distance, the ranging will again change to a distance close to the vessel and then again gradually increase. This, with the system set for automatic ranging, will continue to occur as long as desired.

In the use of the system for ranging in a water medium, as, for instance, in a vessel under way, a transmitting and receiving unit having directional beam characteristics may be employed which may be rotated continually about 360° around the whole horizon. In this case a signal will be transmitted during the rotation of the projector or transmitter through a given sector and then the receiver will be rotated through the same sector at the desired time interval later. The time of rotation for successive revolutions may be substantially the same or vary little so that observations are made at approximately a constant range. In this respect the system is similar to that disclosed in the application of Edward W. Smith, Serial No. 343,977, filed July 5, 1940.

The sequence of operations during the ranging may be any one of a number of combinations. In one of the preferable arrangements in accordance with my invention I first continuously transmit a signal in the forward sector of the vessel, which may for example be 180°, by the rotation through the sector of a directional high frequency sound projector which may be of the magnetostrictive, piezoelectric, electromagnetic or electrodynamic type, and then automatically change the system over from transmitting to receiving for the same sector. The same device may be used for sending as for receiving, in which case the projector, after it has finished sending while rotating through the first 180°, may be permitted while silent to rotate through the aft 180°, and then, the system having automatically changed over to reception, the projector begins to pick up reflected signals in the sector in which the original signal was sent. This results in a time interval between transmitting and receiving in any given direction equal to the time it takes the projector to rotate 360°, and which time interval therefore determines the distance at which the ranging is to be done; that is, only objects at that distance or multiples thereof will be detected. The speed of rotation of the projector therefore controls this ranging distance. It is also possible to arrange the system so that after the projector has received in the forward 180°, it will begin to transmit in the aft 180° and similarly one turn later begin to receive in the aft 180°. Again, the system can be so arranged that at the end of the 180° period of reception in the aft sector, transmission in the forward range will again occur, with the cycle of ranging alternately forward and aft repeating itself from this point. Also by the use of a receiving projector whose beam is 180° from the transmitting projector it is possible to transmit for say one half revolution and immediately receive through the same angle on the receiving projector with no hiatus between the cessation of transmission and the beginning of reception.

When the switches in my system are set for automatic ranging, ranging commences at a distance close to the vessel and gradually increases to the maximum range, whereupon ranging is quickly brought back again to the inner range close to the vessel. This is accomplished by an automatic control of the speed of rotation of the projector as hereinafter described.

The present system preferably provides a recording mechanism for recording each individual observation of a reflected signal on a sheet which travels in a straight path at a chosen rate which may be constant or varied as desired. The incoming signal representing the echo from the unknown object is recorded both as to distance and direction with reference to a center point. For this purpose the recording stylus which produces the record is rotated about a center point in synchronism with the rotation of the projector and receiver so that the stylus' direction from the center point at the instant that the record is made is the direction of the object; moreover, the stylus is positioned radially from the center point so that its distance from the center point gives a measure of the distance of the object. The traces of successive observations of the object may be produced as a straight line for an indication of a collision course between the object and the observing vessel.

A clearer understanding of the operation of the system and its many applications and advantages together with its novelty over the art will be obtained and appreciated from the description below which is given in connection with the accompanying drawings showing an embodiment of the invention. In the drawings Fig. 1 shows the system as a whole in a simplified schematic general layout;

Fig. 3 shows a sectional view taken substantially on the line 3—3 of Fig. 2;

Figure 2:
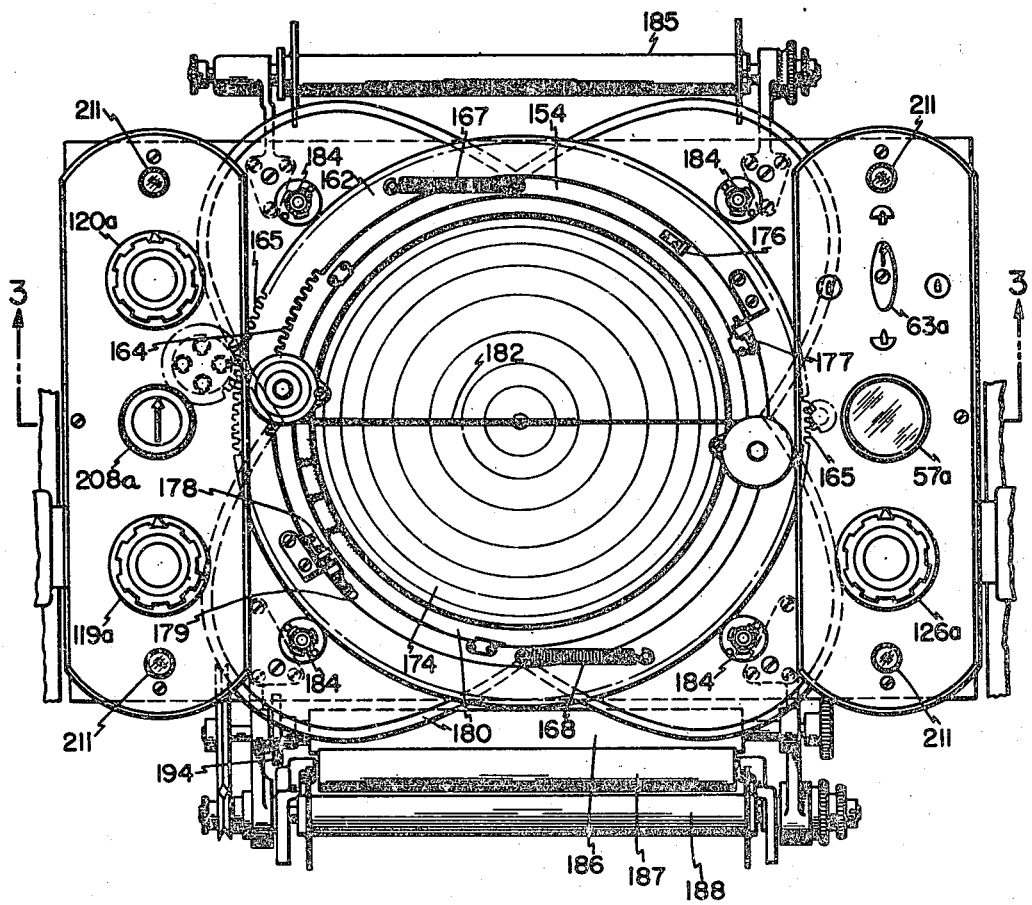
Fig. 2 shows a plan view of the recording and control mechanism with the cover thereof removed.
Figure 4:
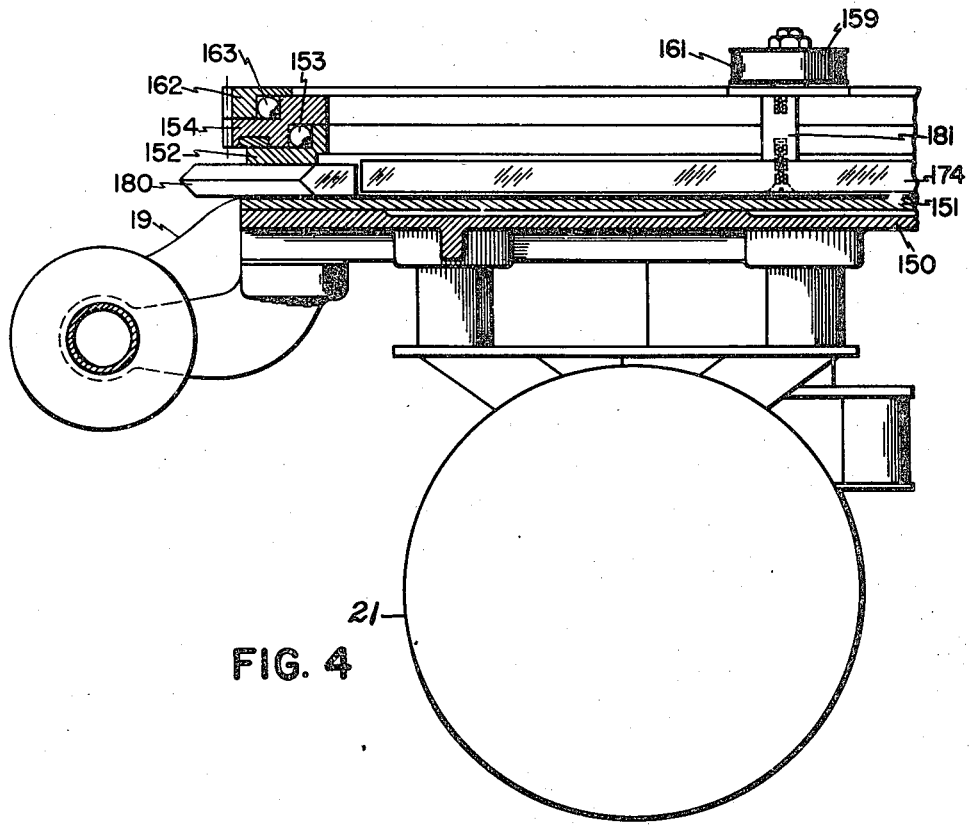
Fig. 4 shows a detail sectional view taken substantially on the line 4—4 of Fig. 3.
Figure 8:
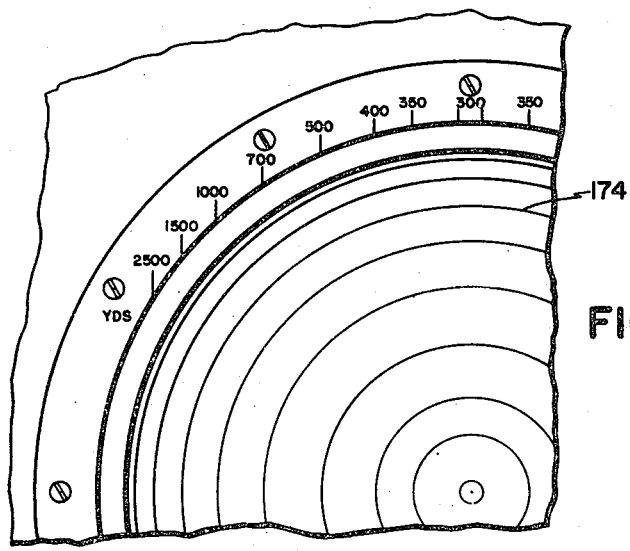
Figure 9:
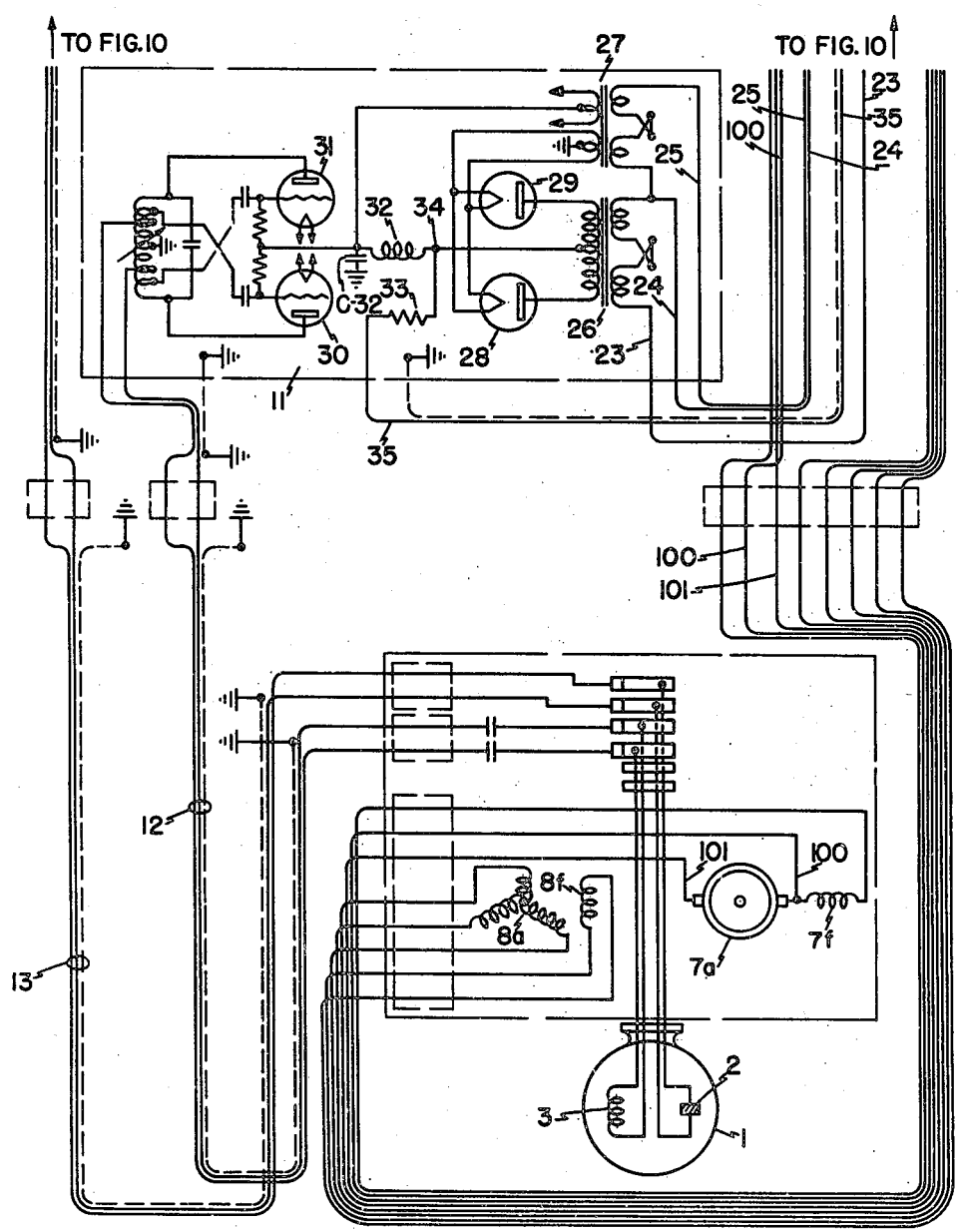
Figure 10:
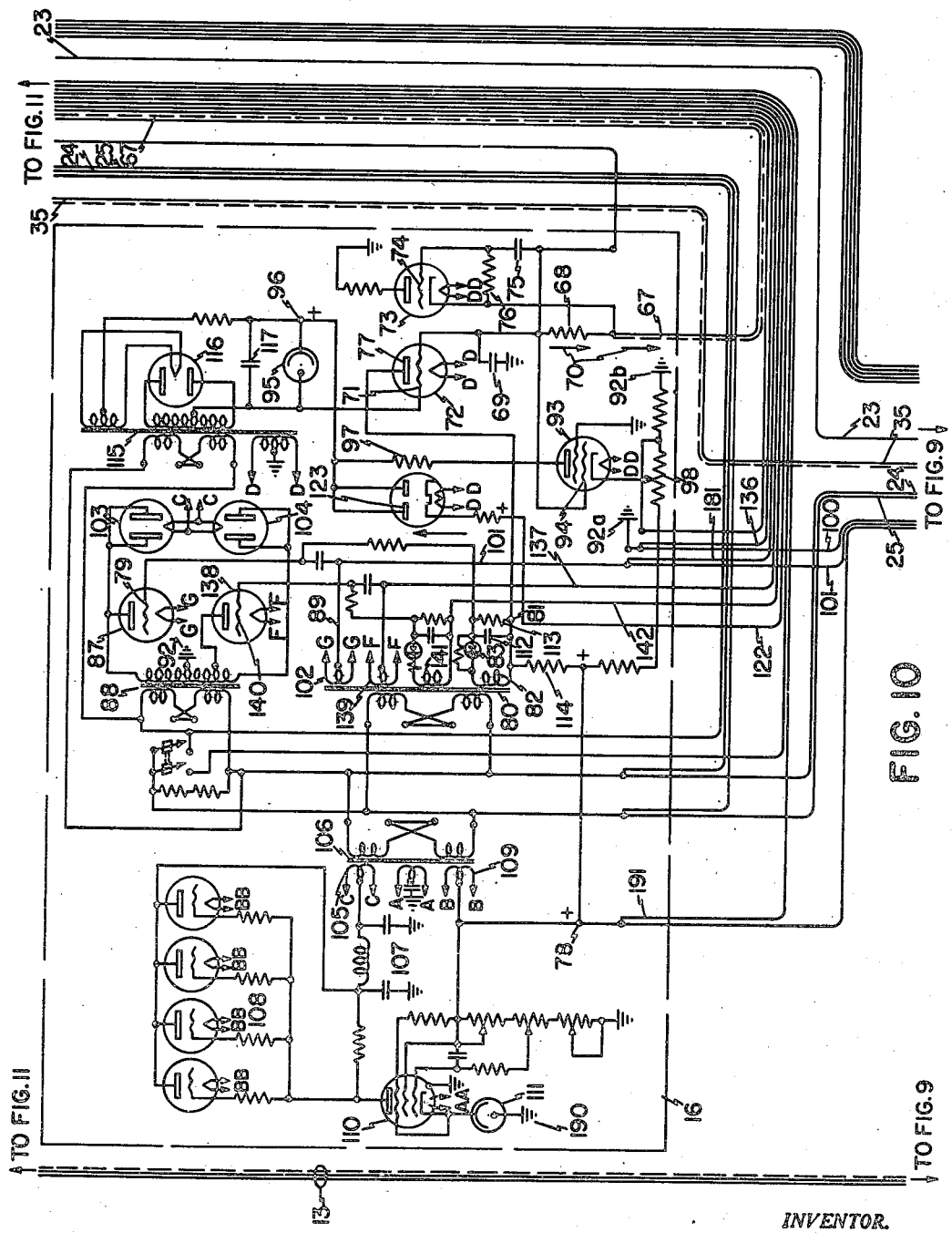

Fig. 8 shows an enlarged detail of a part of the cover which fits over the mechanism shown in Fig. 2; and Figs. 9, 10, 11 and 12 together represent a complete schematic wiring diagram of the system. Fig. 9 should be held with the long dimension of the sheet vertical and includes primarily the projector, its rotating mechanism and its power supply; Fig. 10 continues from the top of Fig. 9 when the sheet of Fig. 10 is placed horizontally above Fig. 9 with the arrows marked "To Fig. 9" opposite the arrows on Fig. 9 marked "To Fig. 10" and includes primarily the speed control unit; the diagram is further continued in Fig. 11, placed horizontally above Fig. 10 with the arrows marked "To Fig. 10" opposite the arrows on Fig. 10 marked "To Fig. 11" and Fig. 11 includes primarily the receiver amplifier; and Fig. 12, held horizontally, continues and completes the diagram when the arrow at the left marked "To Fig. 11" is placed opposite the arrow at the right on Fig. 11, marked "To Fig. 12" and includes primarily the recorder instrument and control switches.

Figure 1:
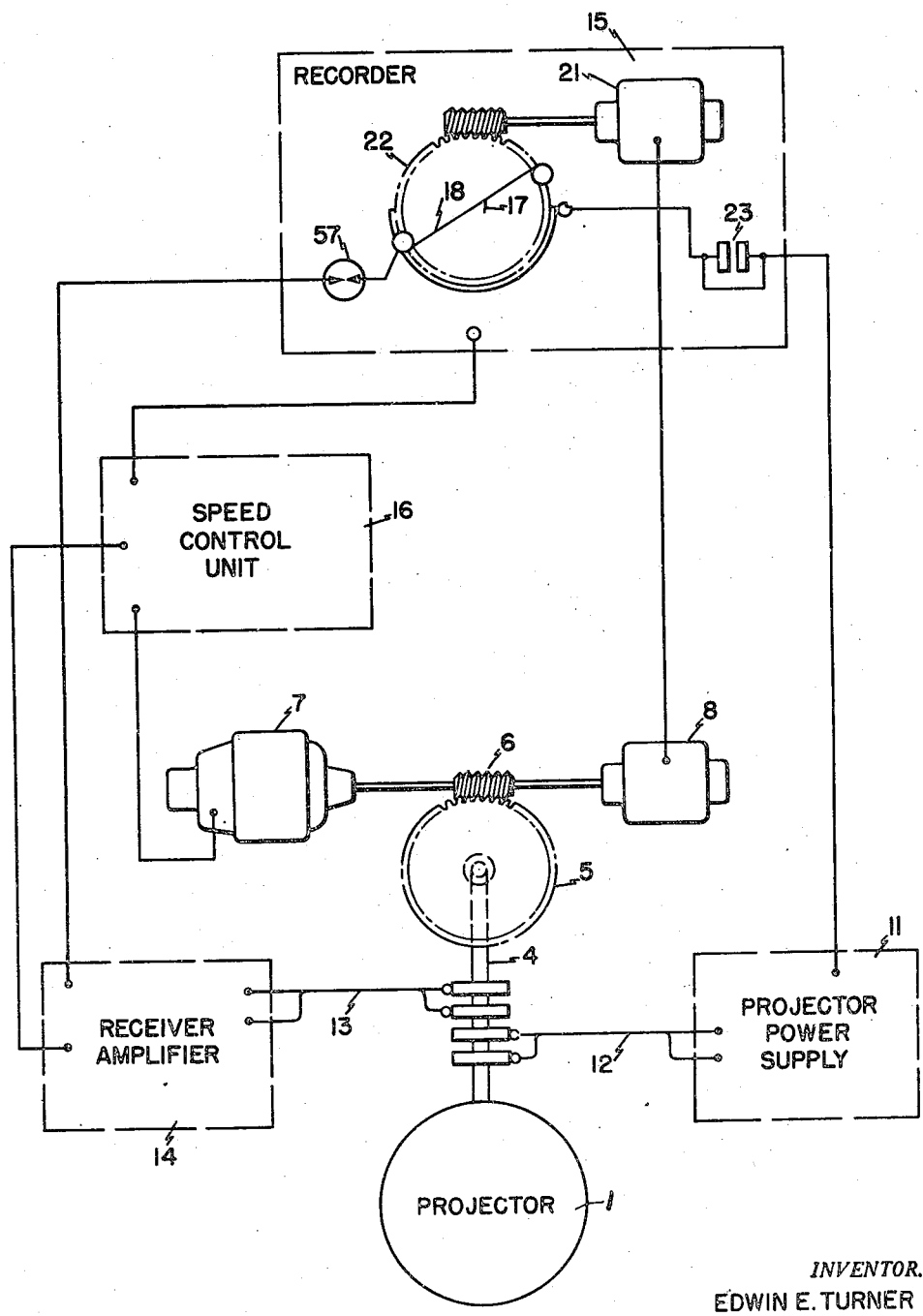

Fig. 1 of the drawings indicates the apparatus schematically in simplified form. There is a compressional wave projector 1, which corresponds to the same numbered element shown in Fig. 9. This may be provided with two separate projector units if desired, of the same construction, or of different construction mounted back to back with each other as indicated diagrammatically in Fig. 9, or for some purposes a single unit may be sufficient. As shown in Fig. 9, the projector unit 2 on the right may be a piezoelectric crystal projector, and the unit 3 on the left a magnetostrictive projector. Both of these units have directive characteristics for transmitting and receiving wave energy in a narrow band or solid angle whose axis is horizontal or, more generally stated, in a plane perpendicular to the rotating axis of the device. However, it should be understood that only a single unit is essential, although both units may be used.

When installed upon a vessel the device 1 may project from the bottom of the vessel and be rotated by means of a shaft 4 driven by a gear 5 through its worm 6 which is turned by means of a driving motor 7 whose speed is controlled by a speed control unit 16 as described below. In Fig. 1, the gear 5 is illustrated diagrammatically in a vertical position so as to show that it meshes with the worm 6; actually, however, it is mounted concentric with the shaft 4.

This driving motor 7 corresponds to the elements numbered 7a and 7f in Fig. 9. The motor 7 is attached by its shaft to the worm 6 and to the armature shaft of the self-synchronous motor 8 so that its rotor 8f (Fig. 9) is always mechanically connected to the armature 7a of the motor 7.

One of the projector units, e. g., the magnetostrictive unit 3, may be used as a transmitting unit and may be energized by a high frequency driving circuit by means of a power supply 11 (Fig. 1) which may be called the projector power supply. The circuit arrangements of this power supply appear in detail in the upper portion of Fig. 9. The other projector unit, in this case the crystal unit 2, may be used as a receiving unit. While receiving, the signal picked up is passed to a receiver amplifier 14. The circuit arrangements of the receiver amplifier are shown in detail in Fig. 11. Thus in the circuit, as arranged in Fig. 9 of the drawings, the left half 3 of the projector is connected to the projector power supply 11 over the shielded cable 12. The right half 2 of the projector is connected to cable 13 which passes upward at the extreme left of Fig. 9 whence it continues through Fig. 10, at the extreme left and into Fig. 11, in the same relative position, where it is applied to the receiver amplifier 14.

If desired a switching arrangement may be employed to operate the projector units in the reverse manner; that is to say, the projector which receives may act as a transmitter and the one which transmits may act as a receiver.

Referring again to Fig. 1, besides the elements already mentioned, there are also used a recorder and operational control unit 15 and an electronic motor speed control unit 16. The circuit arrangements of the recorder and control unit 15 are shown in detail in Fig. 12 while its mechanical arrangements are shown in Figs. 2 to 8 inclusive. The circuit arrangements of the motor speed control unit 16 are shown in detail in Fig. 10.

In the recorder and control unit 15, a record is made by a stylus 17 which is carried on a self-adjustable ribbon or band 18. The stylus 17 marks on a continuously moving recording paper beneath it. The stylus assembly, which includes the ribbon 18 and other elements which will be described, is rotated by means of the self-synchronous motor 21 which is driven by the self-synchronous generator 8. The result of this is that the stylus assembly rotates in complete synchronism with the rotation of the projector 1, so that the position of the stylus with respect to the axis of rotation of the stylus assembly is relatively the same as the direction in which the projector points or receives at the instant that the record is made.

The electronic control unit 16 is arranged to control the speed of the motor 7 so that both the projector 1 and the stylus assembly 22 will rotate at the same desired speed. Other purposes of the control unit 16 are to provide automatic control of the speed dependent upon the rate at which reflected signals or echoes are received and to provide control also of the speed by means of range-control settings in the unit 15.

The projector is keyed for transmission by means of a cam key 23, whose operation will be explained more fully later, during a selected sector of the projector's rotation corresponding to a sector of rotation of the stylus. The time interval between the end of transmission and the beginning of reception over the sector being searched or observed thus depends upon the time interval it takes for the projector to rotate around to the initial position for reception. It follows that the range from which an echo will come back and be received by the projector depends upon the time it takes for the projector to make a complete revolution, when a single projector unit is used for both transmission and reception. This may be explained simply by saying that if for half of a revolution of the projector a signal has been sent out, then when the projector is in position to receive (on the beginning of the next revolution) the time elapsed will be the time of a single revolution. If this, we assume, is four seconds, and if further, we assume that the speed of sound in water is 4800' per second, then a returning echo will come from a distance of approximately 9600', so that for this speed of rotation of the projector and of the stylus assembly, observations will be made of objects at that distance. An arrangement is employed in the stylus assembly which will be described later whereby the stylus 17 remains a distance out from its axis of rotation proportional to the range which is being observed. It will be noted from the above discussion that the speed of rotation of the projector determines the range observed and the stylus mechanism operable in a proportional relation with such speed of rotation provides a measurement of the range with respect to the stylus' center of rotation. It should be noted here that it has been found expedient for certain ranges of operation, namely short ranges, to modify this arrangement by utilizing one projector for transmission and another projector whose beam axis is opposite in space to that of the first projector by 180° for reception, transmitting on the transmitting projector for half a revolution and receiving on the receiving projector for the subsequent half revolution. Under these conditions the speed of rotation is obviously halved for the range as above described. It has been found that the first-mentioned arrangement, namely, the use of the same projector for transmission and reception, is to be preferred for long range echoes because the hiatus between the cessation of transmission after the first half revolution and the beginning of reception after the first full revolution serves as an interval to allow the local reverberations to die out before the recording point is made active. The second condition where separate transducers are used for transmission and reception can be made to operate well at the shorter ranges because at these ranges the echoes are sufficiently above the reverberation level so that reverberations may be eliminated by a simple reduction of gain. The reverberations which bother under these conditions are those occurring immediately after the cessation of transmission and are received on the receiving projector even though its beam axis is 180 degrees away from the transmitting beam axis by virtue of local diffraction around the projector. It must be pointed out that this system of scanning echo ranging has certain unique advantages with respect to reverberations not possessed by other systems, namely that at any given speed of rotation, that is to say at any given range, reverberations are being received only from that range. Thus automatic elimination of short time reverberations at ranges between the target and the ship is effected. It is these reverberations which are so troublesome with the usual searchlight type of echo ranging in depth along a single line.

Certain functions and operations of the circuits will now be described in connection with the circuit diagram in Figs. 9 to 12. The high frequency power supply or oscillator for furnishing the desired oscillatory frequency to the projector is the unit 11. The oscillator 11 may be energized from the ship's supply connected to the conductors 24, 25, Fig. 9, and carried on the lines 23, 24, 25 which connect to the transformers 26 and 27 whose secondaries are connected to the rectifiers 28 and 29. The output of these rectifiers is applied to the anode-cathode circuit of a conventional oscillator including the oscillatory tubes 30 and 31.

However, the rectifier output is applied to the oscillator through a time delay circuit composed of a choke 32, a condenser C32 and a resistance 33. The result of this arrangement is that the point 34 at the right end of the choke as viewed in Fig. 9 has a negative voltage applied to it before the rush of power is applied to the projector. This high negative voltage of the point 34 is applied through the resistance 33 and the cable 35 which passes through the circuit of Fig. 10 to Fig. 11 where it is connected to the screen grids 50', 51' of tubes 50, 51, respectively, and to screen grids 37, 38 of the tubes 39, 40, respectively, in the receiving-amplifying circuit. The tubes 50 and 51 are in the first amplifier stage, while tubes 39 and 40 are in the second stage of the amplifier. Thus when the power supply 11 is keyed, there is such a high negative bias placed upon the amplifier tubes during signal transmission that the receiving circuit automatically becomes blocked and no disturbance due to the directly transmitted signal will affect the indicating circuit during the transmission of the signal. This protects the receiving circuit in such a manner that when the negative potential is later slowly relieved, as will be explained later, the circuit is ready in time to receive and indicate any impulse which might be picked up. It will be noted that the tubes 50, 51 and tubes 39, 40, respectively, are arranged in push-pull circuits. This is done so that the surge, produced in each half of the push-pull circuits by the sudden application of the negative voltage on the grids, will be balanced out with the result that no voltage will appear at the amplifier output terminals.

When transmission stops, the negative potential at the point 34 is removed. The screens 50', 51' and 37, 38 in the tubes 50, 51 and 39, 40, respectively, will thereafter come up to a positive potential relatively slowly because of a time constant circuit made up of the condenser 42 and the resistance 43 (Fig. 11). This is aided by the use of one side of a rectifier 44, connected to the time delay circuit through lead 45, and arranged in such a way to permit the rapid application of the negative potential to the grids 50′, 51′ and 37, 38 but, on the contrary, a slow build-up of positive potential on these grids through condenser 42, since the rectifier will provide an open circuit for current flowing other than in the direction of arrow 45′. It will be noted that while the rapid collapse of current in transformer 46, between the last stage of the amplifier and the detector, caused by the application of the negative bias to the grids 37 and 38, will put a negative charge on the detector tubes 47 and 48, this does not affect the conditions of the receiving circuit since the tubes should be cut off during signal transmission. On the other hand, the slow increase of current occurring after the negative charge is removed does not induce a sufficient potential in transformer 46 to affect the detector tubes in any substantial manner. In this way, no switches or other means are necessary to cut out the receiving circuit and the latter may therefore remain connected to the projectors at all times.

The receiving circuit from the projector 1 (Fig. 9) leads through the receiving cable 13 which can be traced through Fig. 10 to Fig. 11, where the projector potential is impressed upon the input transformer 49 in the receiver amplifier 14. The secondary of transformer 49 is connected to the grids 52 and 53 of the tubes 50 and 51 in a tuned push-pull circuit. This first stage, which is of supersonic frequency but generally called radio frequency amplification, is connected to the second stage including tubes 39 and 40 through a similar coupling transformer 54. The signal, after being passed through the radio frequency amplifier stages, is similarly impressed by the transformer 46 on the detector stage which includes tubes 47 and 48. These are connected in push-pull with respect to the grids but in parallel with respect to the plates.

The detector tubes are connected through an output circuit to a trigger tube 55 which, through cable 56, operates a discharge tube indicator 57, and the marking stylus 17 (Fig. 12). The stylus 17 is connected through the record sheet 19 to ground. It will be noted that these two signal devices 57 and 17 are in series in the output circuit of the trigger tube 55. The arrangement of the combination of the detector tubes 47, 48 and the tube 55 is in general similar to that which is used in my prior Patent No. 2,033,160.

The output of the trigger tube 55 is also used to control the speed of the motor 7, establishing from time to time, through the electronic control unit 16, the rate of rotation of the projector and the recorder assembly 22 of Fig. 1. For this purpose the output of tube 55 is connected to the primary of a transformer 58. The secondary 58a of this transformer is connected by one terminal to a conductor 62 and by the other terminal to the other side of rectifier tube 44 which permits current to flow only in one direction, that is, through the tube in such a way that current will always flow in the direction of the arrow 61 in the conductor 62. The latter leads from Fig. 11 to Fig. 12 up through a single pole, single throw switch 64, to the first position contact of pole 63d of a five pole, four-position switch 63 which may be designated as the "range switch." When this range switch is, for instance, in the position shown in Fig. 12, the circuit continues through a "microswitch" 66 by way of conductor 67, through switch blade 63d, back through Fig. 11 to Fig. 10. Here conductor 67 is connected to a series resistor 68, whence the circuit continues through the condenser 69 and is completed through ground.

Condenser 69 is also connected to the grid 71 of vacuum tube 72. Across resistor 68 there is connected the grid circuit of another vacuum tube 73. The grid terminal of resistor 68 is connected to the grid 74 through series condenser 75, while the other terminal of resistor 68 is connected to the cathode of tube 73. A resistor 76 is also provided directly between grid 74 and the cathode. Now since the current in the conductor 67 will flow in the direction of the arrow 70, the grid 71 of the high vacuum tube 72 will become negative with respect to ground when a signal impulse is received and triggers tube 55. For the same reason, the grid 74 of the tube 73 will also be made negative with respect to ground because of the direction in which the pulse goes through the resistor 68 as indicated by the arrow 70.

The charge on the condenser 69 will accumulate with successive signal pulses, the total charge from time to time depending upon the rate of receipt of signal pulses, as will appear below. This charge on the condenser 69 acts to reduce the current through tube 72 since its grid 71 becomes more negative with respect to its cathode which is at ground potential. As will be seen later the function of tube 72 is to control the operation of the gaseous discharge tube 87 which directly determines the speed of motor 7.

The function of tube 73 is to prevent the discharge of condenser 69 except in the circumstance where no signals are being received. To this end, the tube 73 provides a means for the slow discharge of condenser 69 only when signals stop. The anode of tube 73, it will be noted, is connected to ground through a current limiting resistor. When tube 73 is conductive, it will therefore discharge condenser 69 through resistor 68, tube 73 and its anode resistor. Tube 73 however remains non-conductive by grid-rectification so long as signal pulses pass through resistor 68 since condenser 75 is negatively charged thereby. This charge, however, slowly leaks off over resistance 76 so that if no signals are being received, condenser 75 discharges, making tube 73 conductive, gradually discharging condenser 69 and permitting tube 72 to become more conductive. The time constant of the grid circuit of tube 73 is so chosen that, after two or three echoes have been missed in succession, tube 73 will become conducting, thereby beginning the discharge of condenser 69.

Now the anode 77 of tube 72 is connected to the grid circuit of a gaseous grid-controlled rectifier tube 87. The anode of this tube is supplied with alternating potential from transformers 88, whose center-tap is connected to ground at 92, whence the circuit is completed by way of grounded terminal 92a, conductor 100 to Fig. 9, where it is connected to the armature 7a, thence by conductor 101 back to Fig. 10 to the conductor 89 which is connected to the center-tap of filament transformer secondary 102 and thereby to the cathode of tube 87.

Between the grid and cathode of tube 87 there is also applied a constant, direct, positive voltage in series opposition to the back E. M. F. of motor 7. This applied positive voltage at point 78 may be of the order of 220 volts to ground, its chosen magnitude being determined chiefly by the characteristics of motor 7. This voltage is derived from the plate transformer 88 and the full wave rectifier which includes the tubes 103 and 104 which are connected across the entire secondary of transformer 88. The cathodes of these rectifiers are connected across the secondary 105 of a filament transformer 106. The center tap of the secondary 105 leads through a filter circuit 107 and through four parallel-connected vacuum tubes in circuit 108, which tubes may be of the type known as 2A3 and may have their filaments connected to the secondary 109 of transformer 106. The grids of the four recifier tubes are connected in the anode circuit of an amplifier tube 110, which may be of the type known as 6SJ7, whose cathode is connected to ground through a gaseous voltage regulator tube 111. The circuit just described, which is of conventional design, produces a nearly pure direct voltage which is very carefully regulated to maintain its value in spite of supply line voltage variations.

Since the cathode of tube 87 is connected to transformer secondary 102 whose center tap is grounded at 92a through the armature 7a of the projector rotating motor, there is thus applied to the grid of tube 87 the algebraic sum of a positive voltage from the D. C. source just described and the armature back E. M. F.

A fourth voltage applied to the grid of tube 87 consists of a negative pulse applied periodically during the half cycles when the tube's anode is positive. This negative pulse is obtained from the secondary 82 of the transformer 80 with the aid of a rectifier 83 which is connected in series with it. Across the transformer and rectifier is a condenser 112 and a resistor 113. This circuit is similar to that described in the application of William G. Gorton, Serial No. 511,159, filed November 20, 1943 now Patent No. 2,466,022 granted April 5, 1949. The voltage pulse produced on the grid by this circuit decreases from a relatively high negative value at the beginning of the positive half cycle of anode voltage substantially uniformly to the end of the positive half cycle to a value at which the tube just barely remains inoperative.

It will be observed now that there are four voltages on the grid of tube 87; first, the positive voltage supplied by the rectifier tubes 103 and 104, second, the motor back E. M. F., third, the negative voltage which appears across resistor 113 as just described and, fourth, a negative voltage dependent on the current flow through tube 72. The first three of these voltages establish a certain speed for motor 7; the fourth voltage determines whether the motor runs at that speed or slower or faster.

In further consideration of this fourth voltage it will be noted that as the grid 71 of the tube 72 becomes more highly negative, less current is passed through the tube so that the potential of the plate 77 rises with respect to the applied direct current voltage at the point 78. The increase of the potential on the plate 77 thus increases relatively the positive potential applied to the grid 79, through the connection made to the resistance 113 at the point 81.

There are thus applied to grid 79 voltages whose algebraic sum establishes, during each alternating current cycle, the instant of discharge in the cycle of the triode 87. These discharge pulses are applied to the motor 7 (Fig. 9), the armature of which, as previously described, is in series in the cathode-anode output circuit of the tube 87.

When the charge on the condenser 69 continues to increase, the positive potential at the point 81 will continue to rise (because current in plate circuit 77 decreases, thus decreasing the voltage drop across resistor 114, which drop opposes the positive voltage from point 78), placing continually a higher and higher positive potential on the grid 79 of tube 87 in such a manner that a greater amount of energy will be supplied in each A. C. cycle to the motor 7 to increase its speed and the speed of rotation of projector 1. Under these circumstances, the range from which echoes can be received will decrease with an increase in the rate of receipt of incoming signals. Thus the distance at which ranging takes place is automatically adjusted as determined by the constants of the circuit in such a manner that the distance ranged will correspond to the distance of a detected object from the observing station while the object and the latter are approaching each other.

This is true even though the object and station are approaching at an increasing rate or at a rate greater than that for which the circuits are normally adjusted. In such cases the reflected signals will arrive at the projector in less than a full projector revolution, the projector's directional characteristic being broad enough to permit this. Hence condenser 69 will accumulate a charge more rapidly, and cause the projector to speed up more rapidly in its rotation.

On the contrary, when a detected object is receding, reflected signals will soon cease being received. The charge on condenser 69 will not of course increase. Under these conditions, the charge on the condenser 75 which is continually leaking off through the resistor 76 will within a certain time interval, depending upon the constants of its circuit, permit the negative charge to leak off of the grid 74 and thereby permit the tube 73 to become conductive, under which conditions the charge remaining on the condenser 69 will also begin to leak off. As this charge begins to leak off, the negative potential on the grid 71 of the tube 72 decreases, more current flows through the tube, producing an increased voltage drop across resistor 114 opposing the applied positive potential; and consequently, the positive potential at the point 81 lowers, which has the effect of permitting less current to flow through the thyratron 87, and therefore, slowing up the rotation of the projector motor. As a result, therefore, if the signals are lost, the range will gradually increase either until a signal is again picked up or until the projector has slowed down in its rotational speed until the maximum range has been reached.

The maximum range is controlled by the effect of the state of charge of the condenser 69 upon another circuit. This circuit includes a gas tube 93 having its control grid 94 connected to condenser 69, and its cathode connected through an adjustable potentiometer resistance 98 to ground 92b. The resistance 98, which may be in series with other resistances, is also connected to point 78 at which there is a high positive potential with respect to ground supplied from rectifiers 103, 104 as previously described. The cathode of tube 93 thus is at a certain positive potential above ground. The anode of tube 93 is connected through resistance 97 to the positive side of a separate D. C. supply at point 96. This D. C. supply circuit includes transformer 115 and a full wave rectifier 116 having across its output a condenser 117 and a voltage regulator gas tube 95. The grid 71 of tube 72 is connected to the negative side of this D. C. supply. Thus the anode circuit of trigger tube 93 may be traced from positive potential point 96 to the anode of tube 93 through the tube to its cathode, through resistance 98 to ground 92b, thence to the ground side of condenser 69, to grid 71 to tube 95 and back to point 96.

Now, when condenser 69 discharges, the bias on grid 94 of the trigger tube 93 is permitted to go relatively positive, whereupon the tube will suddenly trigger and the positive potential applied across it from the point 96 will be applied to the condenser 69 which will thereupon again become negatively charged to place a negative charge on the grid 71 of the tube 72. This negative potential is such a high potential that immediately the potential of the point 81 goes back to its most positive point and the projector rotating motor 7 begins to speed up very rapidly to reduce the range in an effort to catch the missing echoes. It will be noted, however, that during this operation the condenser 75 does not receive any charge since the operation of the tube 93 is not through the resistor 68. Therefore, while the condenser 69 is charged to a high potential, it immediately begins to leak off, through tube 73, the rate of which may be established so that after the projector motor has established a minimum range of observation it will again begin to lengthen its range if no signal has been received. The minimum range (i. e. maximum speed of motor 7) is determined by the value of the resistor 97; the voltage drop across which and the charge acquired by condenser 69 together determine the cutoff point of current through tube 93 by reduction of anode voltage below the value required to maintain conduction. This leaves condenser 69 with a certain charge which begins to leak off. The speed of motor 7 thus attains a maximum value, after which it again decreases. Of course, when a signal is received, a pulse again appears across the resistor 68 and a negative bias is again established on the grid 74 stopping the leak and discharge of the condenser 69 as previously described.

It will thus be apparent that in the system as so far described, when the switches are set for automatic ranging, the projector will rotate at a certain maximum speed whereby ranging will be carried out at a correspondingly minimum distance from the vessel; then the projector will gradually decrease its speed of rotation whereby the ranging distance decreases until a certain minimum motor speed and maximum ranging distance is attained. Still assuming no echoes are received, the projector will then automatically increase its speed to a maximum and repeat the process. If at any time a signal is received which has been reflected from some object in the field, the speed of rotation of the projector will automatically change to keep the ranging distance equal to the distance of the object until the object has moved outside of the maximum or minimum ranging distances.

Automatic ranging in this manner is however useful only in the forward sector when the ship is in motion, although it can be used in the aft sector when the ship is stationary. This is due to the fact that the noise of the ship's propeller from the aft sector is always much more intense than any reflected signal so that the automatic ranging system will not work aft of the vessel when the ship is underway. The range switch 63, Fig. 12, has four positions, three for ranging and one for simple listening. The extreme left position is for ranging forward, the second position is for ranging fore and aft, the third position is for ranging aft and the fourth position is for listening. Since automatic ranging can not be used aft or fore and aft when the ship is underway, I have provided means which automatically make it impossible for the operator to use automatic ranging in these two switch positions when the ship is underway, but which on the other hand do make it possible for the operator to carry out ranging by manually adjusting the motor speed and thereby the distance at which ranging takes place.

It will be observed from the diagram in Fig. 12 that with the range switch 63 in position one, which is for ranging forward of the vessel, the microswitch 66 is short-circuited by switch arm 63d. However, for all other positions of range switch 63, that is for ranging fore and aft or ranging aft only, microswitch 66 is in series in the control circuit. This switch 66 is normally open but it is closed mechanically when the paper feed control 120 is set to correspond to zero ship's speed. When switch 66 is open, switch 63 being in second or third positions, it will be observed that conductors 62 and 67 will be open so that the circuit of trigger tube 55 in the receiver amplifier, Fig. 11, will not be connected to the control unit 16; therefore the charge on condenser 69, the operation of gas tube 87 and the speed of motor 7 will not be affected by returning echoes.

The speed of motor 7 is, on the contrary, controlled by the operator manually by means of potentiometer 119 in Fig. 12. The voltage supplied by this is applied through conductor 121, switch arm 63b of switch 63, and conductor 122, to the diode 123 in Fig. 10. Current will flow through the diode 123 when the voltage across output tube 95 minus the potential across the condenser 69 is greater than the voltage set on the control potentiometer 119. The condenser 69 therefore reaches a substantially constant state of charge, depending upon the adjustment of potentiometer 119 and the rate of leakage through tube 73. It will be observed that since the diode 123 is conductive in only one direction, the presence of the manual speed control potentiometer 119 has no effect upon the circuit when the system is set for automatic ranging. It will also be observed that even when switch 63 is set for ranging in the forward sector only, it is possible for the operator to cut out the automatic ranging feature and to control the speed of rotation of the projector manually simply by opening the switch 64 in Fig. 12.

One feature of the system which has not yet been discussed is an automatic sensitivity control whereby the system is automatically conditioned to receive only signals which have an intensity substantially the same as the last previously received signal. By means of this arrangement most extraneous noises can be eliminated from the receiving circuit so that they will not affect the automatic ranging system. For the purposes of this automatic sensitivity control there is provided in the receiver amplifier, Fig. 11, in the detector tube stage, a source of grid bias by means of a condenser 124 which is connected between the center tap of the secondary of the detector input transformer 46 and ground. In shunt with this condenser is a leak resistance 125. The values of condenser 124 and resistance 125 are so chosen that the circuit will have a time constant such that the charge on condenser 124 will leak off at a slow rate. In the circuit shown the condenser may for example have a capacity of one microfarad while the resistance 125 may be of the order of 20 megohms. It will be evident now that incoming signals will cause a potential to build up gradually on condenser 124. The condenser will eventually reach a potential which is determined by the intensity of incoming signals and the rate of discharge of the condenser through resistance 125. The charge on the condenser is applied negatively to the grids of both detector tubes 47 and 48. By this means the detector tubes can pass current only when signals are received which have a larger potential value than the bias provided by condenser 124. Consequently the strongest signal in the field from time to time will set the value of this grid bias and weaker signals will not operate the recorder or the indicator. If however the reflecting object should move farther away so that the reflected signals become of lesser intensity, the reflected signal may be missed during one excursion of the projector but by the time of its next excursion the charge on condenser 124 will have been reduced so that the reflected signals will again appear. An automatic sensitivity control circuit of this type is more fully described in my Patent No. 2,108,090, dated February 15, 1938.

A manually operated sensitivity control is also provided in the potentiometer 126, Fig. 12, which through conductor 127 provides a biasing potential on the input stage 50, 51 of the amplifier, Fig. 11. Mechanically coupled to the sensitivity control 126 is a switch 128 which is normally closed on contact 129 but which is open when the sensitivity control 126 is moved to the position of full sensitivity. It will be noted that the terminal 129 of switch 128 is connected by conductor 130 to the center tap of the secondary of the detector input transformer 46, namely, the same point to which the automatic sensitivity control time delay circuit 124, 125 is connected. Thus when switch 128 is closed, this point is grounded so that the automatic sensitivity control is inoperative when manual sensitivity control is being used. The automatic sensitivity control is also inoperative when the ranging switch is set for ranging fore and aft and for ranging aft when the ship is under way. This is determined by microswitch 13', Fig. 12, which is connected in parallel with switch 128. The condition of switch 13' is determined by the paper feed speed control 120, such that the switch is normally closed, thereby cutting out the automatic sensitivity control, unless control 120 is adjusted for zero ship's speed. It will also be noted that the switch 13' is connected into the system through range switch pole 63c. Thus the switch 13' is operative only when the range switch 63 is set for ranging fore and aft or aft. The reason for making the automatic sensitivity control inoperative in these switch positions is that the propeller noise arriving from aft of the vessel when the ship is under way would always be of sufficient intensity to set the bias on condenser 124 so that the automatic sensitivity control could not function when ranging aft. My automatic system therefore makes it impossible to use automatic sensitivity control when ranging aft.

The fourth position of range switch 63 is for listening to the noises made by objects to be detected. It will be understood that when range switch 63 is set in this fourth position no signals are sent out by the projector but the projector is always in a condition to receive signals during its entire rotation. The speed of rotation for listening is fixed by means of resistor 132, Fig. 12, which is connected to the fourth position of second pole 63b of range switch 63. Thereby, through conductor 122 and rectifier tube 123, a fixed charge is accumulated on condenser 69 whereby the operating conditions of tube 87 are fixed and the motor 7 runs at a fixed speed. This speed is adjusted to a value which will bring the stylus 17 of the recorder 15 into a position on the recording paper along a circle approximately midway between the center and the outside of the record.

Since the relation of the speed of rotation of the projector and the ranging distance is an equilateral hyperbola, the record paper is arranged to be moved continuously through the recorder at a speed which is an inverse square function of the speed of rotation of the projector and is further manually adjustable in accordance with the speed of the observing vessel. This makes possible an accurate calibration of the record at all ranging distances and at all ship's speeds.

Figure 5:
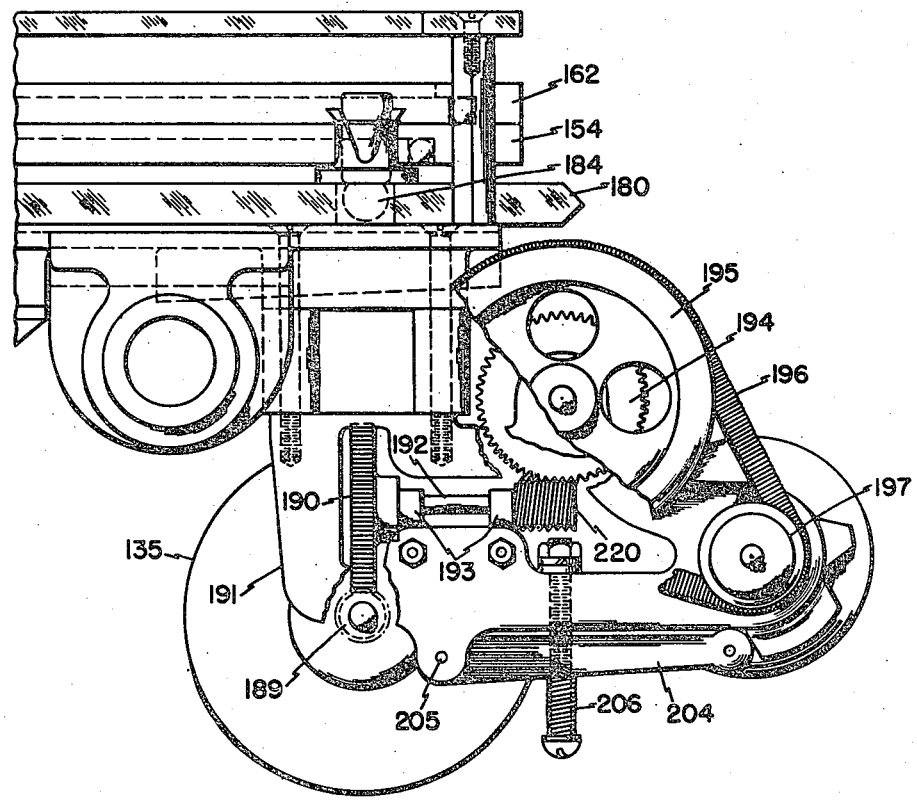
Fig. 5 shows in elevation an enlarged detail looking at the lower left-hand portion of Fig. 2.
Figure 7:
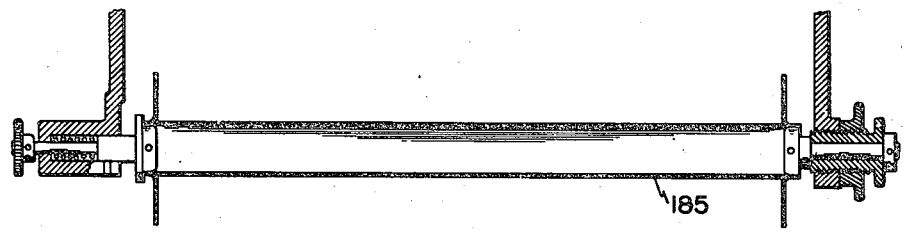
Fig. 7 shows a detail with fragments in section of the top paper roll of Fig. 2, viewed from the under side.
Figure 6:
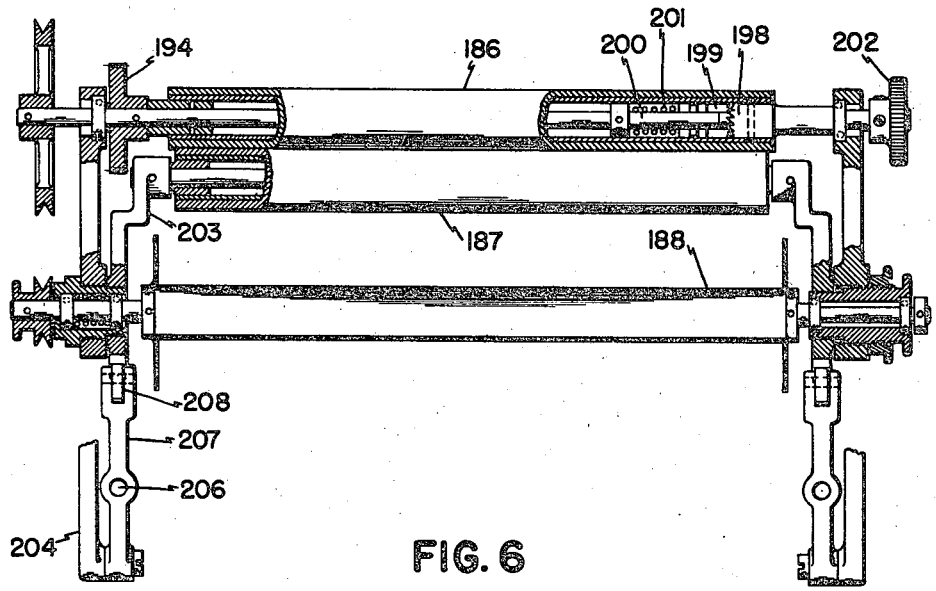
Fig. 6 shows a detail partly in fragmentary section looking from the underside of the lower portion of the mechanism shown in Fig. 2.

The paper is drawn through the recorder by a motor 135, Fig. 12, and which also appears in Fig. 5. The field 135f of the paper feed motor is supplied with a D. C. voltage which varies inversely with the speed of rotation of the projector 1. For this purpose, field winding 135f is connected across two voltages in opposition to each other. One is a fixed voltage derived from the regulated power supply (Fig. 10) and the other is the voltage across the armature of motor 7. Thus the circuit of field winding may be traced from the field winding 135f through conductors 181 and 101 across the motor armature 7a, the return connection being made by way of conductor 100, ground 92a, Fig. 10, ground 190 in the power supply, Fig. 10, to the point 78; thence by conductor 191 to the field resistance 183 and back to the field winding 135f. Since the power supply voltage is always higher than the voltage across armature 7a, the strength of the field in motor 135 varies inversely with the speed of motor 7 whereby the speed of motor 135 also varies inversely as the speed of motor 7.

The armature 135a is connected by conductors 136 and 137 to the output of gaseous triode 138. This circuit may be traced from the armature 135a, Fig. 12, conductor 137 to Fig. 10 to the center tap of filament transformer secondary 139 through the tube 138 to the ground 92, thence to the ground 92a and back through conductor 136 to the armature 135a, Fig. 12. The grid 140 of tube 138 has three voltages applied to it. The first voltage consists of a negative pulse periodically applied during the positive half cycles of anode potential. This negative pulse is obtained from the secondary 141 of the transformer 80 in combination with a rectifier, condenser and resistor in the same manner as for the gaseous triode circuit previously described for the gaseous triode 87. A positive controlling voltage is also applied to the grid 140. This voltage is the difference between a portion of the voltage across armature 7a and a voltage obtained from potentiometer 120 (Fig. 12) which is manually adjustable in proportion to ship's speed. Here, too, the armature 7a voltage is smaller than the potentiometer voltage, so that again the speed of motor 135 varies inversely as the speed of motor 7. Consequently the resultant speed of motor 135 varies inversely as the square of the speed of motor 7.

Referring now to the mechanical arrangements of the recorder 15 and of the control elements as shown more particularly in Figs. 2 to 8, inclusive, it will be observed that the recorder in general consists of a mechanism to draw a record chart 19 at a suitable rate beneath the stylus 17, plus a mechanism for moving the stylus radially outward from a center point by an amount proportional to the distance at which ranging is being done and to rotate the stylus about the center point at a speed equal to the speed of rotation of the projector 1. Mounted at the bottom of a frame 150 is an electrically grounded platen 151 over which the record paper 19 is drawn. A fixed ring 152 carrying a ball bearing race 153 is mounted on the frame 150. A movable ring 154 is rotatably mounted on the ball bearings and has gear teeth cut in its periphery. These mesh with a gear 155 fixed to shaft 156 which at its lower end has mounted on it bevel gear 157 meshing with spur gear 158 on the self-synchronous motor 21. The latter, it will be recalled, is operated by self-synchronous generator 8 on the same shaft with the projector rotating motor 7. On the ring 154 there are mounted two spools 159 and 160 on which is wound a metal ribbon 161 which carries the stylus 17. The ribbon 161 extends diametrically across the record sheet and is rotated when the ring 154 is rotated so that the stylus 17 is similarly rotated about a center point.

A third ring 162 is mounted on ball bearings 163 rotatably upon the ring 154. The ring 162 has gear teeth 164 extending over a short sector of its inner periphery and gear teeth 165 extending around its outer periphery. The teeth 164 mesh with gear teeth on the bottom portion of the hub of spool 160 so that as ring 162 rotates more or less spool 160 rotates to wind up the ribbon 161 which is held under tension by means of a coil spring 166 in the spool 159. By this rotation of spool 160 the stylus 17 is moved radially inwards or outwards from the center point.

The ring 162 is connected with the ring 154 by means of coil springs 167 and 168 as shown in Fig. 2. The gear teeth 165 on the outer periphery of ring 162 mesh with pinion 169 fixed to a shaft 170 which carries at its lower end an eddy current disc 171. The disc 171 rotates between the poles of permanent magnets 172 whereby eddy currents are induced in the disc 171 producing a force which opposes the rotation of ring 162 which force is proportional to the speed of rotation. The lower side of disc 171 is provided with cooling fins 173 to dissipate the heat developed when the disc rotates. This heat dissipation may be of the order of 15 watts.

It will now be evident that as the disc 154 is rotated by the motor 21 the rotation will tend to be transmitted to the ring 162 through the springs 167 and 168. However, the ring 162 will not rotate directly with the ring 154 because of the drag imposed by the eddy current motor 171. Since this drag varies with the speed of rotation, the ring 162 will lag behind the ring 154 by an amount dependent upon the speed of rotation. This difference in the angular positions of the two rings 162 and 154 is transmitted by teeth 164 to the spool 160 whereby the stylus 17 takes up a position between the center of rotation and the periphery of the record area dependent upon the speed of rotation of the driving motor 21 and therefore of the projector 1.

The record area can therefore be calibrated directly in units of distance. This is done on a transparent plate 174 supported by pillars 181 on ring 154 so that the two rotate together. A slot 182 (Fig. 2) is cut in the plate to permit the stylus 17 to pass through. Due to the relation between the speed of motor 7 and the distance at which ranging takes place, whereby the product of this speed and distance is a constant, the distance calibration of the record area will not be uniform but will be equilaterally hyperbolic; hence equal range increments near the ship, that is near the center of the record area, will be spread out and equal range increments far from the ship, that is near the periphery of the record area, will be closer together.

Since ranging will of course never be carried out nearer to the ship than a certain minimum distance fixed by the maximum practicable speed of rotation of the projector it is desirable to limit the stylus' travel toward the center. Similarly, it is desirable to limit the maximum excursion of the stylus from the center. The first is accomplished by means of a stop 176 secured to the ring 154 and adjusting screw 177 mounted in a bracket on the ring 162. The maximum excursion of the stylus is controlled by the stop 178 on ring 154 and adjustable screw 179 on ring 162.

Since the whole stylus assembly is rotating in synchronism with projector 1 the angular position of the stylus always corresponds to the angular position of the directional characteristic of the projector. The periphery of the record area can therefore be calibrated in degrees with reference, for example, to the bow of the ship. The directional calibration may be made as shown in Fig. 2 around the circumference of a circular aperture in a translucent member 180 mounted around the plate 174 and near the level of the record paper.

The member 180 also forms part of a unique system of indirect illumination by which the record paper is uniformly illuminated. As indicated in Fig. 2, the member 180, which may conveniently be made of a transparent plastic substance, consists of a flat plate having a central circular aperture as previously mentioned and having its outside edge cut into four elliptical corners. The outer edge of member 180 is preferably beveled both top and bottom at 45° to provide a light reflecting edge surface. Four lights 184 are mounted in apertures in these elliptical corners so as to extend down into the plastic plate at one focus of each of the ellipses. The ellipses are so cut that the other focus of each ellipse comes at the center of rotation of the stylus-carrying system. Light rays will therefore pass edgewise directly out of the plastic member toward the record area and other light rays which strike the edges of the ellipses will also be reflected directly toward the center of the record area. By this means the record paper as well as the calibration on the plate 174 and the calibration cut on the upper or lower surface of plate 180 receive uniform illumination.

The record paper supply is on a roll 185 mounted at the upper end of the recorder as viewed in Fig. 2. The paper then passes over the platen 151 and between roll 186 which is the driving roll and roll 187 and then is finally wound up on take-up spool 188. The last three elements are mounted on the lower end of the recorder as viewed in Fig. 2.

The paper drive mechanism is shown in more detail in Fig. 5 where the paper feed motor 135 appears in an end view. On its shaft is mounted worm gear 189 which meshes with spur gear 190 mounted on a shaft 192 supported in bearings 193 mounted on a bracket 191 supported by the frame of the instrument. The shaft 192 also carries a worm gear 220 which meshes with a spur gear 194, fixed to the shaft of the driving spool 186. The shaft of driving spool 186 also carries a pulley 195 around which passes a spring belt 196 which also passes around a pulley 197 on the shaft of the take-up spool 188. The supply spool 185 and the take-up spool 188 are removably held in their bearings in a conventional manner as more particularly indicated in Figs. 6 and 7. The driving roll 186 is hollow inside. The outer shell of the roll is fixed on one end to a ratchet crown wheel 198 which engages a corresponding ratchet wheel 199 fixed to the shaft 200 and pressed against ratchet wheel 198 by means of a coil spring 201. It is on the shaft 200 that the driving gear 194 is mounted so that the roll 186 can be turned by hand by means of the knob 202 to advance the paper manually if desired. The pressure idler roll 187 is journaled in brackets 203 which are pivoted around the hub of the take-up spool 188 and is pressed against the drive roll 186 by an arm 207, pivoted in the bracket 203 at 208. An arm 204 whose other end is pivoted to the frame 191 at 205 urges arm 207 upwards by means of spring 206. By this means the roll 187 presses the paper firmly against the driving roll 186 so that a friction drive is produced which pulls the paper through the recorder. However, by depressing the arm 204 the roll 187 may be pulled away from roll 186 so that the paper can be threaded between them when a new supply spool is to be inserted in the instrument.

Referring again to Fig. 2 it will be noted that the range switch and other control potentiometers have their operating members arranged on panels on both sides of the recorder. Thus in the right hand panel the range selecting switch operating knob 63a controls the range switch 63 in Fig. 12; in the position shown the switch is set for ranging forward. If turned clockwise by 90°, it would be set for fore and aft. The next clockwise position is for ranging aft, and the fourth position is for listening. Below the range switch knob 63a may be seen a cover glass or filter 57a which is above the neon tube echo indicator 57 which appears in elevation in Fig. 3. Below this is the control knob 126a operating sensitivity control potentiometer 126. At the upper part of the left panel in Fig. 2, 120a is the operating knob for potentiometer 120 which adjusts the speed of the paper feed motor in accordance with ship's speed. At the lower part of the left panel there appears the operating knob 119a of the speed control potentiometer 119. Between 119a and 120a appears the operating knob 208a of the light intensity control potentiometer 208. As indicated in Fig. 12 this potentiometer controls the intensity of all the lights in the instrument, being connected by conductors 209 and 210 to the transformer secondary whose terminals are marked EE in Fig. 11 to provide power for operating the instrument lights. These lights include the four lights 184 which illuminate the paper and four operating panel illuminating lights 211 which appear in Fig. 2.

The projector keying switches 213 and 214, Fig. 12, are operated by the recorder mechanism. Mounted in the lower side of ring 154 is an insert 212, Fig. 3, which rotates with the ring. The insert 212 is in the form of a cam having a raised portion extending over half of its circumference. A roller cam follower rides on the cam 212 and operates the keying switch 213 in Fig. 12. This switch connects the projector to the power supply during one half of its revolution whereby the projector transmits a beam of compressional waves provided the range switch 63 is in its first position for ranging forward.

Referring again to Fig. 3 a worm gear 217 is mounted on the shaft 156 which rotates a spur gear (not shown) on the shaft 215 and thereby rotates a cam 216. The cam 216 is eccentric and during one half of its revolution bears against the roller cam follower 218 which operates microswitch 214 connected in the circuit as shown in Fig. 12. By means of this switch the projector is caused to perform one complete echo ranging cycle forward of the beam and then to repeat aft of the beam alternately so as to cover 360° in two steps of 180° each. This is done by transmitting from bearing 270° to bearing 90° subsequently receiving on the next half revolution on these same bearings with the other half of the projector; then with the elapse of a half revolution, during which neither transmission nor reception takes place, repeating the procedure outlined above on bearing 90° to 270° thus covering 360° in two steps when the range switch 63 is set in its second position for ranging both fore and aft.

Having now described my invention, I claim:

1. A method of echo ranging with compressional waves which comprises rotating a beam of compressional waves through a sector to be searched, rotating a directive receiver through the same sector a definite time interval later, continuing rotation through said sector alternately of a beam of waves and of said receiver, but during each excursion at a slightly modified speed of rotation, and utilizing the speed of rotation during each excursion to determine the range of remote objects detected by said receiver during said excursion.

2. A method of echo ranging with compressional waves which comprises rotating a beam of compressional waves through a sector to be searched, rotating a directive receiver through the same sector a definite time interval later and continuing rotation through said sector alternately of a beam of waves and of said receiver space pattern, but during each excursion at a slightly increased speed of rotation until a maximum speed is reached, then gradually in successive excursions reducing the rotating speed of both the beam and the receiver to a minimum speed and again continuing the rotation alternately of the beam and the receiver in each excursion at a slightly increased speed, and utilizing the speed of rotation during each excursion to determine the range of remote objects detected by said receiver during said excursion.

3. A method of echo ranging with compressional waves which comprises rotating a beam of compressional waves through a sector to be searched, rotating a directive receiver for reflected signals through the same sector a definite time interval later and continuing rotation through said sector alternately of a beam of waves and said receiver, but during each excursion at a slightly modified speed of rotation until a reflected signal is received, then modifying the speed of rotation of both the beam and the receiver by an amount depending upon the rate at which reflected signals are received, and utilizing the speed of rotation during each excursion to determine the range of remote objects detected by said receiver during said excursion.

4. A method of echo ranging with compressional waves which comprises rotating a beam of compressional waves through a sector to be searched, rotating a directive receiver through the same sector a definite time interval later and continuing rotation through said sector alternately of a beam of waves and said receiver, but in each successive excursion slightly modifying the speed of rotation of both the beam and the receiver by a predetermined amount when no echoes have been received and by an amount depending upon the rate of receipt of echoes when echoes are received, and utilizing the speed of rotation during each excursion to determine the range of remote objects detected by said receiver during said excursion.

5. Apparatus for echo ranging with compressional waves including a directional compressional wave transducer, means for rotating said transducer, means for transmitting thereby a beam of compressional waves through a selected sector of rotation, means for subsequently receiving reflected waves with said transducer during a subsequent rotation through the same sector but at a later time depending upon the speed of rotation, means for varying the speed of rotation of said transducer in proportion to the rate at which echoes are received, and means utilizing said speed of rotation to determine the range of remote objects detected by said transducer as a receiver.

6. Apparatus for echo ranging with compressional waves including a directional compressional wave transducer, means for rotating said transducer, means for transmitting thereby compressional waves through a selected sector of rotation, means for subsequently receiving reflected waves with said transducer during a subsequent rotation through the same sector but at a later time depending upon the speed of rotation, means for varying the speed of rotation of said transducer in proportion to the rate at which echoes are received, said last named means including, in the receiving means, means for producing an electrical impulse in response to the receipt of reflected signals, an electron tube circuit for operating said rotating means, said circuit being responsive to said electrical impulses for varying the speed of said rotating means, and means utilizing said speed of rotation to determine the range of remote objects detected by said transducer as a receiver.

7. A system for detecting objects by means of wave energy radiated by said objects, comprising in combination with a vessel, a direction wave energy receiver mounted thereon, means for rotating said receiver, and means for recording the direction from the vessel from which wave energy is received and for indicating on the record the rate of change of said direction, said means including a record paper, a stylus for marking thereon, said stylus being mounted on an arm which is rotatable about a point thereon other than the stylus mounting point, means for rotating said arm about said point of rotation in synchronism with said receiver, and means for drawing said record paper beneath said stylus at a rate proportional to the speed of the vessel.

8. A system for echo ranging with compressional waves comprising means for alternately rotating through a sector to be searched, a beam of compressional waves and a directive receiver, means for modifying the speed of rotation of said beam and of said receiver during each excursion, and means utilizing said speed of rotation to determine the range of remote objects detected by said receiver.

9. In an echo ranging system, the combination of a directional compressional wave transducer, means for rotating the same, a receiving circuit connected to said transducer and adapted to produce an electrical impulse in response to received signals, an electron tube circuit for controlling the operation of said rotating means, said tube circuit being responsive to said electrical impulses for varying the speed of said rotating means, and means utilizing said speed to determine the range of the objects from which said received signals are returned.

10. A system for echo ranging with compressional waves comprising a directional compressional wave projector, a directional compressional wave receiver, means for rotating said projector and receiver alternately through a sector to be searched, means for modifying the speed of rotation of both projector and receiver in successive excursions through said sector and means utilizing the instantaneous direction of said receiver and said speed of rotation for recording the distance and direction from the vessel from which wave energy is received in each successive excursion.

11. Apparatus for echo ranging with compressional waves including a directional compressional wave transducer, means for rotating said transducer, means for transmitting thereby a beam of compressional waves through a selected sector of rotation, means for subsequently receiving reflected waves with said transducer during a subsequent rotation through the same sector but at a later time depending upon the speed of rotation, means for varying the speed of rotation of said transducer in proportion to the rate at which echoes are received, means for varying the sensitivity of said receiving means in inverse proportion to the intensity of the received echoes, and means utilizing said speed of rotation to determine the range of the objects causing said echoes.

12. In a system for echo ranging having directive rotating transmitting and receiving means, a recording device operatively connected to said receiving means including a record paper, a stylus for marking thereon, said stylus being in the output of said receiving means, means for moving said stylus in a circular path in synchronism with said rotating means, means including a braking mechanism connected to the stylus moving means for causing the stylus to make a mark on the record paper which lies on a path having a diameter which is inversely proportional to the speed of rotation of said rotating means, and means for drawing said record paper beneath said stylus at a rate proportional to the inverse square of the rate of rotation of said rotating means.

13. In a system for echo ranging from a vessel having directive rotating transmitting and receiving means, a recording device operatively connected to said receiving means including a record paper, a stylus for marking thereon, said stylus being in the output of said receiving means, means for moving said stylus in a circular path in synchronism with said rotating means, means including a braking mechanism connected to the stylus moving means for causing the stylus to make a mark on the record paper which lies on a path having a diameter which is inversely proportional to the speed of rotation of said rotating means, means for drawing said record paper beneath said stylus at a rate proportional to the inverse square of the rate of rotation of said rotating means, and means for further varying rate of travel of said record paper at a rate proportional to the speed of the vessel.

14. In a system for echo ranging having directive rotating transmitting and receiving means, a recording device operatively connected to said receiving means and including a record paper, a stylus for marking thereon, said stylus being in the output of said receiving means, means for moving said stylus in a circular path in synchronism with said rotating means and means connected to the stylus moving means for causing the stylus to make a mark on the record paper which lies on a path having a diameter which is inversely proportional to the speed of rotation of said rotating means, said last-named means connected to the stylus moving means including a spring-tension stylus positioning system and a rotating eddy current disc for applying a force proportional to said speed of rotation in opposition to the spring tension.

EDWIN E. TURNER, Jr.

REFERENCES CITED

The following references are of record in the file of this patent:

UNITED STATES PATENTS

| Number | Name | Date |
| --- | --- | --- |
| 951,658 | Phillips | Mar. 8, 1910 |
| 1,720,148 | Rodanet | July 9, 1929 |
| 1,973,673 | Rice | Sept. 11, 1934 |
| 2,108,090 | Turner | Feb. 15, 1938 |
| 2,131,993 | Wittkuhns et al. | Oct. 4, 1938 |
| 2,231,929 | Lyman | Feb. 18, 1941 |
| 2,272,806 | Klein et al. | Feb. 10, 1942 |
| 2,284,654 | Harrison | June 2, 1942 |
| 2,371,415 | Tolson | Mar. 13, 1945 |
| 2,399,017 | Goldman | Apr. 23, 1946 |
| 2,418,846 | Meacham | Apr. 15, 1947 |

FOREIGN PATENTS

| Number | Country | Date |
| --- | --- | --- |
| 546,202 | Great Britain | July 2, 1942 |